United States Patent [19]

Maxeiner et al.

[11] Patent Number: 4,859,541
[45] Date of Patent: Aug. 22, 1989

[54] SAFETY STRUCTURE

[75] Inventors: Heinz Maxeiner, Neu Isenburg; Gerhard Kruske, Oberursel; Hartwig Reimann, Kelkheim-Liederbach, all of Fed. Rep. of Germany

[73] Assignees: Metallgesellschaft AG, Frankfurt am Main; Bode Panzer Aktiengesellschaft, Hanover, both of Fed. Rep. of Germany

[21] Appl. No.: 20,528

[22] Filed: Feb. 3, 1987

[30] Foreign Application Priority Data

Sep. 6, 1986 [DE] Fed. Rep. of Germany ....... 3630429

[51] Int. Cl.$^4$ .......................... E04B 2/02; B22F 7/00
[52] U.S. Cl. ...................................... 428/545; 109/80;
109/82; 109/84; 109/85; 428/323; 428/325;
428/328; 428/331; 428/444; 428/450; 428/469;
428/579; 428/551; 428/558; 428/565; 428/634;
428/698; 428/702; 428/704; 428/911
[58] Field of Search ............... 428/545, 549, 558, 634,
428/444, 450, 698, 704, 911, 174, 469; 109/78,
80, 81, 82, 85, 84

[56] References Cited

U.S. PATENT DOCUMENTS

| 2,360,798 | 12/1942 | Siligman et al. | 428/634 |
|---|---|---|---|
| 3,205,841 | 9/1965 | Shwayder | 109/82 |
| 3,684,497 | 8/1972 | Wendler et al. | 109/82 |
| 3,715,999 | 2/1973 | Shwayder | 109/82 |
| 3,779,715 | 12/1973 | Wendler et al. | 109/84 |
| 3,828,699 | 8/1974 | Bowen | 109/80 |
| 3,898,729 | 8/1975 | Greene | 109/82 |
| 3,999,954 | 12/1976 | Kolaska et al. | 428/545 |
| 4,408,545 | 10/1983 | Lichter | 109/80 |

FOREIGN PATENT DOCUMENTS

| 1584284 | 7/1965 | Fed. Rep. of Germany | 109/82 |
|---|---|---|---|
| 2559254 | 8/1985 | France | 428/911 |
| 0018421 | 2/1977 | Japan | 428/634 |
| 0086708 | 7/1978 | Japan | 428/634 |

*Primary Examiner*—George F. Lesmes
*Assistant Examiner*—James B. Monroe
*Attorney, Agent, or Firm*—Allegretti & Witcoff, Ltd.

[57] ABSTRACT

A safe having a wall comprising spaced steel plates, a sheathing layer between the plates consisting of hard non-metallic grains of e.g., boron carbide, silicon carbide, boron nitride, diamonds, ceramic oxides and hard metallic grains of e.g., cast iron, metal carbides, nitrides, borides, and silicides, said grains being bound together and to said plates by a hard solder mass having a copper or nickel base. The sheathing layer contains 30–70% by volume of said non-metallic grains (having a grain size of 5 to 20 mm) and metallic grains (having a grain size of 1 to 6 mm) and from 70% to 30% of said hard solder. The ratio of said non-metallic to said metallic grains is 2–4 parts to 1 part by volume. A method for making the sheathing layer is also disclosed.

11 Claims, 1 Drawing Sheet

SAFETY STRUCTURE

BACKGROUND OF THE INVENTION

The invention concerns a wall element for safety structures, particularly for the construction of safes, having two steel plates positioned parallel to each other, and a sheathing layer of hard substance grains positioned between the plates, the intermediary spaces of owhich are filled with hard solder masses connected with one another and connected tightly to the steel plates. Also, to a method of making such a wall element.

Such wall elements must tnot only have an adequate security agaisnt deformation, such as for example, destruction by means of cutting torches and boring devices, but also have as low a specific weight as possible in order to keep the problems of transport and static strain on the buildings in which the safe is installed as low as possible.

PRIOR ART

An armor plating is disclosed in German patent specification 15 84 284 which consists of a steel casing and a filling positioned therein of tightly-packed, irregularly-formed grains of wear-resistant material, the intermediary spaces of which are filled with hard solder mass. The wear-resistant material consists of titanium carbide, zirconium carbide, hafnium carbide, vanadium carbide, niobium carbide, tantalic carbide, chromium carbide, molybdenum carbide, thorium arbide, uranium carbide, plutonium carbide, or tungsten carbide. Nickel bronze is used as a hard solder mass which is tightly connected to the steel casing. This armor plating has not been able to gain an entry into practical use because it does not offer adequate security against thermal attack. An armor plate which is secure against cutting attacks from cutting disks or crown boring devices is described in German patent specification 31 19 578, which consists of a cast-iron plate sheathed with steel or iron wires, and a layer of boric carbide pieces embedded in cast iron which is located thereon, but which is not, however, secure against thermal attack. Finally, reference should be made to the armor plate described in German specification 27 30 384, the external layers of which, made of austenitic steel, connect with an insulating layer of asbestos, fiber mat, or a ceramic fiber plate, a plate-shaped or tabular layer of metal/ceramic material, an insulating layer of plastic, cork or ceramic fiberes, an elastomer layer, in wich small elements of aluminum oxide or boric carbide are embedded, an adhesive layer, which binds the elastomer layer with a conttiguous plate-shaped layer of aluminum or glass fiber-reinforced plastic, and a lattice structure layer of special profile steel. Apart from the fact that the production of such an armor plate is expensive, itts wall thickness of 130 mm, as cited in the example of execution, does not correspond to the requirement of keeping the wall thickness as thin as possible.

THE INVENTION

It is the object of the present invention to so construct the wall element of the structure described above that a compromise is reached between adequate security against destruction and all cutting attacks on one hand and the smallest possible specific weight and wall thickness on the other hand.

This objective is achieved in accordance with the invention by providing a sheathing layer comprising 30 to 70 vol. % of non-metallic hard substance, the rest of hard solder mass. In the framework of the preferred construction of the wall element, the sheathing layer consists of 30 to 50 vol. % hard substance, the rest being hard solder mass.

Non-metallic mechanically resistant materials comprises substances of great hardness which are electrically non-conductive. Preferred are diamond, boron carbide, silicon carbide, boron nitride and ceramic oxides. Ceramic oxides are ceramic materials produced from oxides and oxide compounds in accordance with ceramic methods. The oxide ceramic is to be differentiated from the conventional silica ceramic in which silicic acid is the essential material constituent. Solid oxides and oxide compounds which can be sintered without undergoing decomposition belong in the oxide ceramic class and include aluminum oxide, beryllium oxide, magnesium oxide, calcium oxide, zirconium oxide, titanium oxide, chromium oxide, and spinel (Mg $Al_2 O_4$).

In regard to optimal security, it is appropriate if the non-metallic hard substance is partially replaced by metallic hard substance, preferably in the ratio of 2 to 4 parts non-metallic to one part metallic hard substance.

Metallic mechanically resistant hard substances are good electrical conductors and have a high melting point. Those which are technically important are metallic carbides, nirides, borides, and silicides of all metals, but especially of the transition metals of othe 4th through the 6th group of the periodic table (titanium, zirconium, hafnium, vanadium, niobium, tantalum, chromium, molybdenum, and tungsten). The prefered hard metal substatnces are the carbides ofo tungsten, titanium and tantalum, and hard cast iron.

The sheathing layer contains at least one of the aforesaid metallic hard substances and at least one of the aforesaid non-metallic hard substances. The non-metallic hard substances have a grain size of 5 to 20 mm, preferably 5 to 12 mm, and the metallic hard substances have a grain size of 1 to 6, preferably 3 to 5 mm.

In order to ensure a tight connection bettween the hard solde mass and the steel plates, as well as the metallic hard substatnces, and to fuse the non-metallic hard substances firmly with the hard solder mass, copper and nickel base solders, used individually or as a mixture of at least one copper base solder with one nickel base solder, have proven to be particularly useful. The copper base solders include CuZn-, CuNiZn, CuP-, Cu- and CuSn-solders. The nickel base solders include NiCrSi-, NiBSi-, NiCrSiB-, NiCrP-, NiP- and NiMnSi alloys. The precise composition of these hard solders is described in DIN 8513 (published specification of the Society of German Standards).

By providing within the sheathing layer an intermediary layer, 0.5 to 7.0 mm in thickness, of a high-melting and electrically non-conducting material, such as, for example, asbestos, graphite, and/or ceramic material, the wall element cannot be attacked by electric arc welding, since no electric arc can form.

In another form of the invention, at least one steel sheet 2.0 to 8.0 mm thick is incorporated into the sheathingn layer, and tightly bonded to the hard solder mass, in order to attain an increased resistance to mechanical cutting.

In order to produce wall elements which have parallel faces, and to attain a sheathing effect, itt is appropriate to position spacing units in the sheathing layer.

These are tightly bonded if they consist of metal, with the steel plates, or with the internal steel sheets by the hard solder mass and/or by means of welding.

Spacing units may take the form of strips, plates or bands pointed, trapezoidal, serrated, or circular which, in the area of their profile points, are tightly connected with the steel plates or steel sheets. Bolts consisting of metallic or ceramic material can be positioned as spacing units in the sheathing layer.

SPECIFIC EXAMPLES

To produce the wall elements formed in accordance with the invention, the mixture of hard substance grains and hard solder powder is applied to the one steel plate, the other steel plate is laid onto the mixture, the assembly is preheated at a temperature of 600° to 900° C. in a non-oxidizing atmospher for 10 to 30 minutes, then heated to the melting temperature of the hard solder in a non-oxidizing atmosphere, and maintained at this temperature for 10 to 30 minutes. This treatment provides a tight and solid connection between the hard solder mass and the steel plates and the metallic hard substance grains, and a good fusion of the non-metallic hard substance grains.

Another way to produce the wall elements consists in charging a mixture of hard substance grains and hard solder powder into a form, heating the mixture in the form to the melting temperature of the hard solder in a non-oxidizing atmosphere, while maintaining this temperature for 10 to 30 minutes and cooling the sheathing layer thus formed; applying a hard solder powder layer of 0.5 to 2.0 mm on the surface of a steel plate; laying said sheathing layer on said powder layer; applying a hard solder powder layer of 0.5 to 2.0 mm thickness to the upper side of the sheathing layer; laying a second steel platte onto the same; preheating the assembly in a non-oxidizing atmosphere for 10 to 30 minutes at a temperature of 600° to 900° C.; then raising the temperature to the melting point of the solder powder and maintaining this temperature for 10 to 30 minutes in the non-oxidizing atmosphere.

In accordance with one example of execution, a mixture of 27 vol. % aluminum oxide, 8 vol. % tungsten carbide, 35 vol. % copper, and 30 vol. % NiCrBSi-solder was inserted between parallel plates each 4 mm thick, spaced at a distance of 15 mm. The plates were made of austenitic steel. The assembly thus prepared was heated to 1100° C., and maintained at this temperature for 15 minutes. After cooling to room temperature, there occurred a very firm and tight connection between the hard solder and the steel sheets and the hard substances. In order to avoid heat tensions in the wall element, it is preferred that the assembly is first preheated to a temperature of approximately 800° C., and maintained at this temperature for some time.

THE DRAWINGS

DETAILED DESCRIPTION

Figure 1:
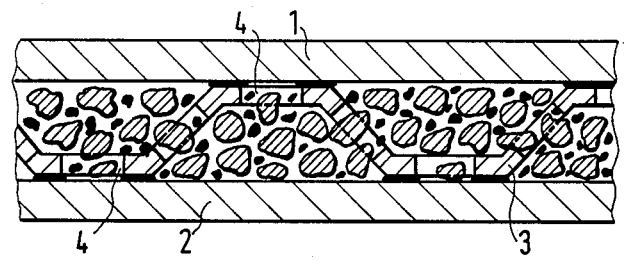
FIG. 1 is a sectional view through a wall element constructed in accordance with the invention and having trapezoidal spacing units.

FIG. 1 depicts a cross-section through a wall element, in which trapezoidal spacing units 3 consisting of a steel band are inserted between the steel plates 1,2. The plats are about 5 mm thick, and are spaced at a distance of about 15 mm. The spacing units in the area of the profile points and plate sides are provided with perforations 4, through which the melted and fluid hard solder ca penetrate. In the area of the profile points, the spacing unit is connected tightly with the steel plates by the hard solder mass.

Figure 2:
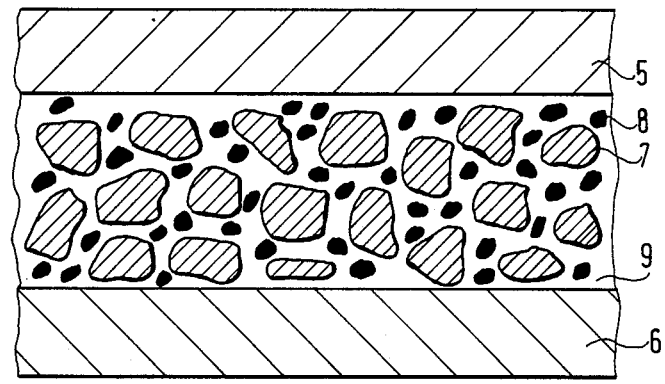
FIG. 2 is a similar view of an alternative construction without the spacing units.

In FIG. 2, a mixture of 12 vol. % cast iron 7, 30 vol. % ceramics 8, 30 vol. % copper solder, and 28 vol. % hard solder 9 of an NiCrBSi alloy are positioned between the steel plates 5, 6. The hard solder mass forms a tight matrix which encases the non-metallic hard substances grains and the mettallic hard substances and renders the sheath integral with the steel plates.

Figure 3:
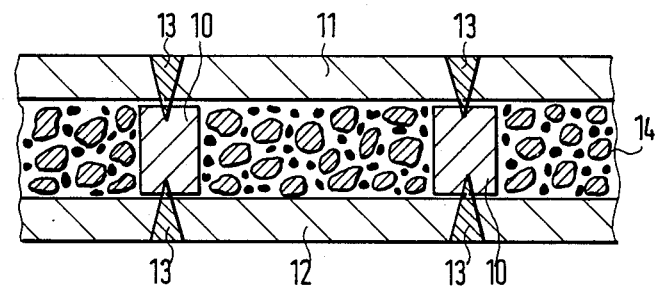
FIG. 3 is a similar view of a further modification showing a different form of spacing units.

In FIG. 3, a wall element is depicted in which metallic bolt-shaped spacing units 10 are connected to the steel plates 11, 12 by means of point welding 13. The sheathing layer 14 consists of a mixture of 30 vol. % aluminum oxide, 15 vol. % cast iron, 10 vol. % tungsten carbide, 30 vol. % CuNiAn solder, and 15 vol. % NiBSi solder. The hard solder mass integrally combines with the steel sheets, the metallic hard substance grains, and the spacing units, and incorporates the non-metallic hard substance grains.

Figure 4:
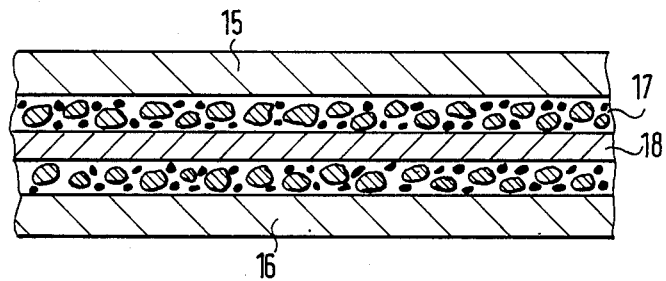
FIG. 4 is a similar view of another form of the invention which includes an intermediate steel sheet between the plates.

In FIG. 4, a steel sheet 18 is positioned in the sheathing layer 17 which is located between the steel plates 15, 16. The sheathing layer 17 consists of 25 vol. % aluminum oxide, 10 vol. % tungsten carbide, 25 vol. % NiCrBSi solder, and 40 vol. % copper solder.

The advantages attained by means of the invention consist in particular of the fact that the wall element is secure against attack from cutting torches, cutting disks and boring devices, and consequently against destruction. The hard substances oppose the cutting disks or boring devices with a considerable resistance. The presence of non-metallic hard substances provides a particular stability against cutting torches. One particular advantage lies in the fact that an effective wall element formed in accordance with the invention can be produced without difficulty with thin walls, that is, with a thickness of 20 to 50 mm which makes them light in weight, an important advantage.

What is claimed is:

1. A wall element for safety structure such as safes comprsing two parallel spaced steel plates;
    a sheathing layer of hard granular material disposed between the plates;
    a hard solder mass between the grains of granular material binding them together and to the inner surfaces of said steel plates;
    characterized in that the sheathing layer is formed from 30–70% by volume of said hard granular material present in the amount of two to four parts by volume of a non-metallic substance taken from the group consisting of diamonds, boron carbide, silicon carbide, boron nitride, and ceramic oxides to one part of a hard metallic substance taken from the group consisting of cast iron, metallic carbides, nitrides, borides and silicides, the remainder being said hard solder mass.

2. The wall element of claim 1, in which said hard granular material constitutes 3–50% by volume of said sheathing layer.

3. The wall element of claim 1 wherein a matrix forms said sheathing layer and wherein said wall element further includes an intermediate layer disposed within said matrix forming said sheathing layer, whereby said sheathing layer is one either side of said intermediate layer, said intermediate layer being formed of an electrically non-conductive, high melting point material 0.5 to 7.0 mm in thickness.

4. The wall of claim 3 in which said intermediate layer consists of asbestos, graphite or ceramic material.

5. The wall element of claim 1, in which said non-metallic substance has a grain size of 5 to 20 mm and said metallic substance has a grain size of 1 to 6 mm.

6. The wall element of claim 1, in which said non-metallic substance has a grain size of 5 to 20 mm and said metallic substance has a grain size of 3 to 5 mm.

7. The wall element of claim 1, in which said solder mass is a copper or nickel base solder or mixtures thereof.

8. The wall element of claim 1, wherein a matrix forms said sheathing layer and wherein said wall element further includes a steel sheet disposed within said matrix forming said sheathing layer, whereby said sheathing layer is on wither side of said steel sheet, said steel sheet being 2.0 to 8.0 in thickness.

9. A wall element for safety structures such as safes comprising two parallel spaced steel plates including spacing units between said steel plates;
   a sheathing layer of hard granular material disposed between the plates;
   a hard solder mass between the grains of granular material binding them together and to the inner surfaces of said steel plates;
   characterized in that the sheathing layer is formed from 30–70% by volume of said hard granular material present in the amount of two to four parts by volume of a non-metallic substance taken from the group consisting of diamonds, boron carbide, silicon carbide, boron nitride, and ceramic oxides to one part of a hard metallic substance taken from the group consisting of cast iron, metallic carbides, nitrides, borides and silicides, the remainder being said hard solder mass.

10. The wall element of claim 9 in which said spacing units are secured to said steel plates by means of said hard solder mass or by welding.

11. The wall element of claim 10 in which said spacing units are bolt shaped and are point welded to said steel plates.

* * * * *